United States Patent Office 2,734,081
Patented Feb. 7, 1956

2,734,081

PREPARATION OF β-ALANINE

Leslie G. Boatright, Stamford, Conn., assignor to American Cyanamid Company, New York, N. Y., a corporation of Maine No Drawing. Application May 18, 1954,
Serial No. 430,728

4 Claims. (Cl. 260—534)

This invention relates to a process of producing a beta-alanine, and more particularly, it relates to a process of producing beta-alanine and poly-beta-alanine from ethylene cyanohydrin.

In accordance with the process of the present invention, a beta-alanine may be prepared by heating ethylene cyanohydrin at a temperature of at least about 70° C. in the presence of a catalytic amount of ammonia. The beta-alanine may then be recovered from the reaction mass.

In carrying out the process of the present invention, the desired amount of ethylene cyanohydrin (beta-hydroxy propionitrile) is placed in a suitable vessel. The vessel may be a pressure vessel of any suitable kind, as for example sealed glass containers.

To the ethylene cyanohydrin there is added ammonia, preferably but not necessarily as aqueous ammonia in the amount of about 0.5–3.0% aqueous 28% ammonia based on the weight of the cyanohydrin. Ammonia may be added as anhydrous ammonia or as aqueous ammonia of any concentration, but it should be equivalent in amount to 0.5–3% aqueous 28% ammonia. It should be pointed out that the ammonia serves the purpose of a catalyst and is not a reactant so far as the reaction is understood. Having added the catalyst the vessel is sealed and the ethylene cyanohydrin mixture is heated.

The extent of the formation of a beta-alanine will depend both on the temperature of the ethylene cyanohydrin and the period of time at which it is maintained at that temperature. If a temperature in the range of about 150°–250° C. is used, then the conversion of ethylene cyanohydrin to a beta-alanine will be substantially complete in a period of about 1–5 hours. If the ethylene cyanohydrin is heated to a temperature of about 70° C. then a period of time of about four weeks is necessary to convert substantially all the ethylene cyanohydrin to a beta-alanine. Temperatures above about 300° C. may cause undue decomposition of the material, whereas temperatures below about 70° C. demand an extraordinarily long period of time in order for appreciable reaction to take place.

After the ethylene cyanohydrin has been subjected to the treatment temperatures for the requisite period of time, it has solidified to a yellow-brown solid. This solid comprises poly-beta alanine. Infrared examination reveals the presence of the peptide linkage

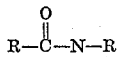

Since the poly-peptide is water soluble, a low molecular weight is indicated. It is estimated that there are about 5–10 beta-alanyl residues in the molecule.

If a beta-alanine monomer is desired, it may be recovered from the poly-peptide by hydrolysis, as by treating with boiling water to which an acid, as for example, hydrochloric acid, has been added. After refluxing for a sufficient length of time, water and excess HCl may be removed under reduced pressure. The remaining material may be crystallized from appropriate solvents to yield substantially pure beta-alanine hydrochloride.

Beta-alanine is an important intermediate for use in the preparation of pantothenic acid.

The following examples are illustrative of the process of the present invention.

Example 1

Five 20-ml. samples of purified ethylene cyanohydrin, each containing 0.2 ml. of 28% aqueous ammonia, are sealed in Pyrex glass test tubes and placed in a Wood's metal bath maintained at 90–100° C. The temperature of the ethylene cyanohydrin is 70–80° C. After about four weeks, the contents of each tube have completely solidified to a yellow-brown solid. This solid is dissolved in about 150 ml. of boiling water. The aqueous solution is boiled with Darco, filtered and cooled. Acetone (500 ml.) is added whereupon a light yellow colored oil layers out. This oil is redissolved in water, boiled with Darco, and reprecipitated with acetone 5 more times. A solid colored faintly yellow is obtained (weight 36 g.). This solid has no melting point but darkens above 200° C. and decomposes at 300° Spectrophotometric examination (infrared) reveals the presence of the peptide linkage,

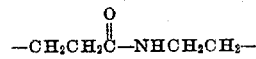

Example 2

To 100 g. of purified ethylene cyanohydrin is added 1 g. of 28% aqueous ammonia and the mixture is maintained at 150° C. for five hours. A yellow-brown solid is obtained. This material is dissolved in 1 liter of concentrated hydrochloric acid and the resulting solution heated under reflux for 48 hours. The solution is then evaporated under reduced pressure until the HCl and H₂O have been removed. An oily brown residue remained which is dissolved in a minimum quantity of 2B-ethanol. The ethanol solution is boiled with Darco, filtered, and ether added. An oily liquid separates. The oil is redissolved in ethanol, boiled with Darco, and reprecipitated with ether. After this procedure has been repeated several times, white water-soluble crystals are obtained (10 g., M. P. 119°–121° C.; M. P. beta-alanine hydrochloride=122° C.).

The infrared absorption spectrum of this material is identical with that of beta-alanine hydrochloride. The molecular weight of the material (by NaOH titration) is 132; calculated for beta-alanine hydrochloride equals 126.

The material analyzes 10.91% nitrogen; calculated for C₃H₈O₂ NCl equals 11.15%.

I claim:

1. The process of producing a beta-alanine which comprises heating ethylene cyanohydrin at a temperature of at least about 70° C. in the presence of a catalytic amount of ammonia equivalent to that in the range of about 0.5–3.0% of 28% aqueous ammonia based on the weight of said ethylene cyanohydrin, and recovering a beta-alanine from the reaction mass.

2. The process of producing beta-alanine which comprises heating ethylene cyanohydrin at a temperature of at least 70° C. in the presence of a catalytic amount of ammonia in the range of about 0.5%–3.0% of 28% aqueous ammonia of the weight of said ethylene cyanohydrin, hydrolyzing the reaction mass, and recovering beta-alanine from said reaction mass.

3. The process of producing a beta-alanine which comprises heating ethylene cyanohydrin at a temperature in the range of about 70°–250° C. for a period of time from about 1 hour to about 4 weeks in the presence of a catalytic amount of ammonia equivalent to that weighing in the range of about 0.5%–3.0% of 28% aqueous ammonia based on the weight of said ethylene cyanohydrin, and recovering a beta-alanine from the reaction mass.

4. The process of producing beta-alanine which comprises heating ethylene cyanohydrin at a temperature in the range of about 70°–250° C. for a period of time in the range of about 1 hour to about four weeks, in the presence of a catalytic amount of ammonia weighing in the range of about 0.5%–3.0% aqueous ammonia based on the weight of said ethylene cyanohydrin, hydrolyzing the reaction mass resulting therefrom, and recovering beta-alanine from said hydrolyzed reaction mass.

References Cited in the file of this patent

UNITED STATES PATENTS 2,364,538   Kirk et al. _____ Dec. 5, 1944